March 27, 1956
R. B. SMITH
2,739,605
DRAIN-OFF VALVE FOR COMPRESSED AIR RESERVOIRS
Filed Oct. 8, 1952
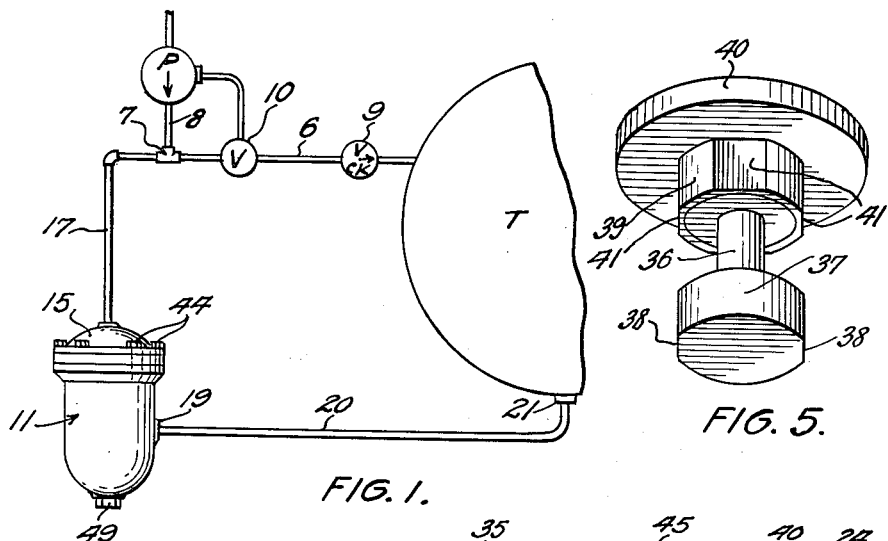
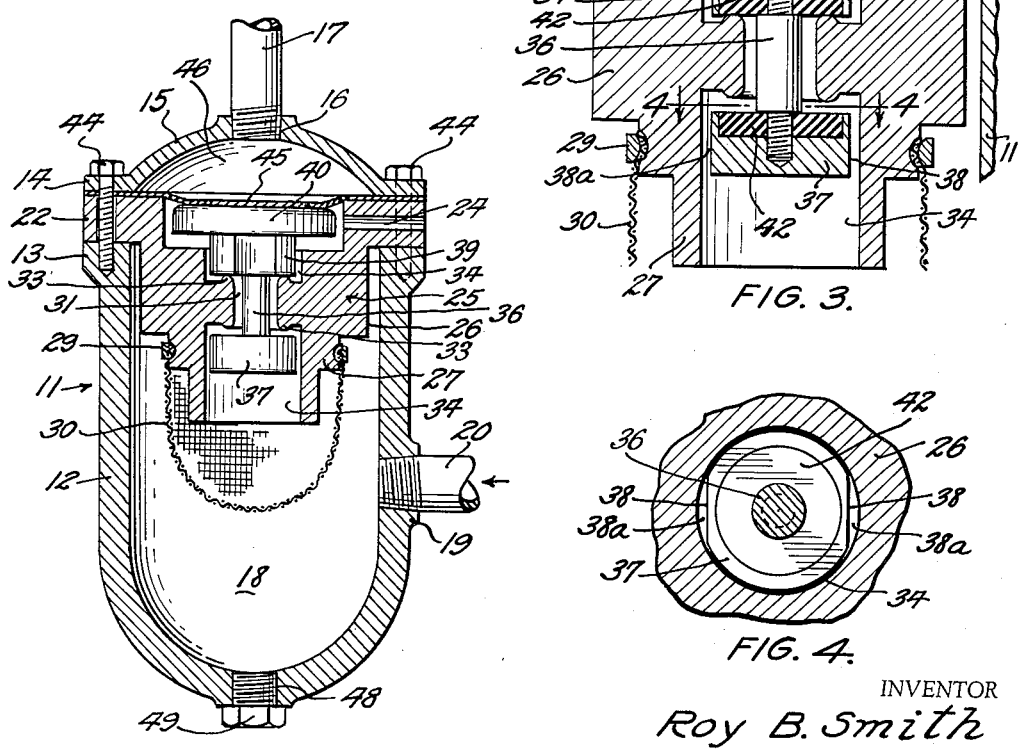
INVENTOR
Roy B. Smith
BY W. H. Rambo
ATTORNEY

United States Patent Office 2,739,605
Patented Mar. 27, 1956

2,739,605

DRAIN-OFF VALVE FOR COMPRESSED AIR RESERVOIRS

Roy B. Smith, Washington Court House, Ohio, assignor to Air Industries Company, Inc., Columbus, Ohio, a corporation of Ohio Application October 8, 1952, Serial No. 313,736

4 Claims. (Cl. 137—204)

The present invention relates to fluid pressure-actuated valves, and more specifically to an improved automatic drain-off or moisture-ejecting valve for use in compressed air systems in removing condensates and foreign matter from the lower regions of compressed air tanks.

I am aware that the prior art discloses numerous different types of valves intended for the purpose of draining off or ejecting moisture and condensates from compressed air tanks, but generally, previously known valves of this type, of which I am aware, are characterized by structural complexities and mechanical inefficiency which render such valves objectionable from the standpoint of manufacture and salability as well as from the standpoint of operational efficiency.

It follows, therefore, that the primary object of the present invention is to provide a mechanically efficient, yet structurally simple, drain-off valve for compressed air systems which is characterized by its economy of manufacture and long range efficiency in operation.

It is another object of the invention to provide a drain-off valve of this character which is comprised of but few and relatively simple parts which are rendered easily accessible for repair and proper maintenance and/or replacement purposes.

A further object of the invention is to provide an automatic drain-off valve for compressed air systems which operates to release condensates and/or foreign matter from a compressed air tank automatically upon each energization and deenergization of an associated compressor.

For a further and more detailed understanding of the present invention and the various additional objects and advantages derived therefrom, reference is to be had to the following description and the accompanying drawing, wherein:

Fig. 1 is a diagrammatic view disclosing my improved drain-off valve in operating relationship to an associated compressed air tank or reservoir and its compressor;

Fig. 2 is a detailed transverse vertical sectional view taken through the present drain-off valve;

Fig. 3 is an enlarged fragmentary vertical sectional view taken through the movable valve member of the drain-off valve;

Fig. 4 is a horizontal sectional view taken along the line 4—4 of Fig. 3; and

Fig. 5 is a detailed perspective view of the movable valve member of the present drain-off valve.

Referring now to the drawing, and more particular to Fig. 1 thereof, a compressed air tank or reservoir is indicated generally at T and may take any suitable configuration. Leading into the upper region of the tank T is an inlet conduit 6 which is connected with a T-fitting 7 connected with the outlet conduit 8 of a compressor P. Connected in the conduit 6 between the T-fitting 7 and tank T is a check valve 9 arranged to open toward the tank, but to prevent the flow of fluids under pressure in a direction away from the tank. Also interposed within the conduit 6 is a standard-type unloading valve 10 which functions to relieve pressure automatically within the conduit 6 and within the outlet side of the compressor P upon deenergization of the compressor. It will here be understood that the elements of the compressed air system described above are standard to the ordinary type of compressor system in present day use, and as such do not constitute any part of the present invention.

In accordance with the present invention, I provide an automatic drain-off or moisture-ejecting valve which comprises a casing, generally indicated by the numeral 11. As seen in Fig. 2, the casing comprises a lower body portion 12 which terminates along its upper edge in an annular boss or attaching flange 13 which is adapted for connection with a cooperative annular flange 14 formed on a dome-shaped lid section 15. The lid section 15 is provided centrally with a threaded conduit connection 16 which receives the cooperatively threaded end of a conduit or pipe 17 leading to the opposite branch of the T-fitting 7 associated with the compressor P.

The lower casing body 12 is formed internally with a chamber 18 and is provided on one side with a conduit connection or inlet port 19 into which is threaded the end of a conduit 20 leading to the lowermost region of the compressed air tank T, as indicated at 21.

Carried upon the attaching flange 13 of the casing 12 is the diametrically enlarged annular flange 22 of a valve body 25 formed with an intermediate portion 26 terminating at its opposite end in a diametrically reduced collar portion 27. The lower collar portion 27 of the body 25 has secured thereto, as by means of a clamping band 29, a cup-shaped strainer element 30 formed from wire mesh screen or any suitable foraminous material.

The valve body 25 is formed with an axially extending passage 31 which terminates at each end in a raised annular valve seat 33. The valve seats 33 disposed at either end of the passage 31 project inwardly of a pair of diametrically enlarged valve chambers or bores 34, and the upper bore 34 is joined with a still larger end bore 35.

Extending axially through the passage 31 formed in the valve 25 is the elongated stem portion 36 of a movable valve member, and carried at the lower end of the stem 36 is a first cylindrical pressure-responsive head or spool part 37, the peripheral wall of which is disposed in close-fitting wiping engagement with the wall of the lower chamber 34 of the body 25. Also, the peripheral wall of the lower valve head 37 is formed with a pair of diametrically opposed flattened areas 38 which define with the inner wall of the lower bore 34 a pair of restricted passages 38a. The upper end of the valve stem 36 carries a second and upper head or spool member 39 whose body portion closely fits the walls of the upper chamber or bore 34 of the body 25, and which terminates at its upper end in a diametrically enlarged and cylindrical cap member 40. The body portion of the spool 39 is formed on its peripheral surface with four circumferentially spaced flats 41 similar to the flattened areas 38 formed on the lower spool member 39. Advantageously, the inner sides of the valve spools or heads 37 and 39, in the planes of the valve seats 33, are recessed and provided with annular, resiliently flexible sealing gaskets 42 formed from any suitable lubricant or oil-resistant synthetic resinous material such as, for example, one of the resiliently flexible vinyl halide polymers. As shown particularly in Fig. 3 of the drawing, the valve stem 36 is considerably longer than the length of the central passage 31 of the valve body 25, in order that, upon movement of the valve member, only one of the heads 37 and 39 will be in seated engagement with the cooperative valve seats 33 at any one time, and that communication is provided between the upper bore 34 and the lower bore 34 of the valve body 25 when the valve member occupies an intermediate position, communication between the upper and lower bores 34 being had by way of the restricted channels or passages provided between the flats 38 and 41 formed on the valve heads and the bores 34 and the spacing between the valve stem 36 and the walls of the passage 31. Intersecting the larger bore 35 of the valve body is a radially disposed atmospheric vent 24 which opens exteriorly of the enlarged flange portion 22.

Clamped between the mating faces of the flanges 22 and 14, as by means of a plurality of radially spaced bolts 44, is the marginal edge portion of a resiliently flexible diaphragm 45. As seen in Fig. 2, the diaphragm 45 provides a closed pressure chamber 46 in the upper portion of the valve casing which is in direct communication with the inlet 16. The central portion of the flexible diaphragm 45 is adapted to lie against and engage the upper surface of the diametrically enlarged cap 40 of the upper valve spool 39. The lower casing body 12 is provided in its lowermost central region with an internally threaded connection 48 which threadedly receives a removable clean-out plug 49.

In operation, assuming the present drain-off valve to be connected in a compressed air system as disclosed in Fig. 1, when the compressor P is at rest or deenergized, fluid pressure from the tank or reservoir T is transmitted through the conduit 20 into the lower chamber 18 of the valve casing 12, and such pressure acts against the lower face of the valve head or spool 37 to force the movable valve member upwardly and to seat the lower annular gasket 42 against the lower valve seat 33, thereby interrupting communication between the lower chamber 18 and the upper portion of the casing containing the diaphragm 45. The movable valve member will remain in this position until the compressor P is energized and the resultant pressure within the conduit 17 leading to the diaphragm chamber 46 approaches the fluid pressure within the tank T and the lower chamber 18 of the valve casing. Due to the fact that the upper face of the diametrically enlarged cap 40 of the upper valve spool has a relatively larger pressure-responsive area than the lower face of the valve spool 37, the valve member will be shifted downwardly in response to a pressure which is slightly less than the pressure present within the tank T and the lower valve chamber 18. As the pressure within the diaphragm chamber 46 increases rather rapidly following energization of the compressor P, the diaphragm 45 is flexed downwardly to press against the upper surface of the enlarged cap 40 of the movable valve member, and thereby to move the valve assembly downwardly, first disengaging the lower spool 37 from its associated seat 33, permitting pressures to escape from the lower valve chamber 18 by way of the restricted slots provided by the two flats 38, the passage 31, the flats 41, and the atmospheric air vent 24. With this release of pressure in the lower chamber 18 of the valve, any moisture or condensates which have accumulated in the lower regions of the tank T are ejected to the atmosphere in the form of a vapor, and any solid foreign matter such as dust or trash is prevented from lodging within the valve assembly by means of the strainer 30, and will drop to the bottom of the lower chamber 18. Continued downward movement of the movable valve member in response to pressures acting upon the diaphragm 45 seats the face of the spool 39 and its annular gasket 42 against its cooperative valve seat 33, thereby to interrupt communication between the lower chamber 18 and the vent 24. It will be understood that the time during which the movable valve member occupies an intermediate position is relatively short, and sufficient only to provide a substantial puff of moisture through the vent 24.

Assuming now that the compressor P has operated for a time sufficient to produce pressures within the tank T of a predetermined high value, the compressor P is deenergized either manually or automatically, whereupon the unloading valve 10 of the compressed air system releases pressure built up within the outlet of the pump or compressor P and the conduits 6 and 17. Thus, as the pressure within the conduit 17 and diaphragm chamber 46 decreases to a point below the pressure of fluid within the tank T and the lower chamber 18, the pressure standing on the lower spool part or head 37 of the movable valve member causes the same once again to be shifted upwardly to unseat the upper valve spool 39 from its seat 33, permitting a flow of moisture vapor from the lower chamber 18 through the passage 31 and outwardly through the vent 24. Continued movement of the valve member causes the lower valve head 37 to seat snugly against its cooperative valve seat 33 and thereby interrupt communication between the lower chamber 18 and the atmospheric vent 24 until the compressor P is once again energized and pressures within the diaphragm chamber 46 rise to a predetermined high level.

As previously mentioned, the lower spool or head 37 of the movable valve member has formed thereon two flats 38, while the upper spool or head 39 is provided with four of such flats 41. Also, it is desirable that the combined cross-sectional areas of the restricted passages provided between the flats 38 and the inner wall of the lower bore 34 equal the cross-sectional area of the atmospheric vent 24, in order that substantially no build-up of pressure will occur within the passage 31 upon opening of the valve member, such as would tend to hold the valve member in an intermediate open position. In this respect, it is important to note that positive and quick action in the movement of the valve member is desirable, in order to prevent fluttering of the valve member due to a substantial equalization of forces acting on opposite ends thereof. It will be seen that when the valve member occupies a downward position, wherein the upper head 39 is seated against the upper valve seat 33, and the compressor is deenergized, once the pressure within the diaphragm chamber 46 falls below a predetermined lower pressure than that within the tank and lower chamber 18, the movable valve member will substantially immediately snap upwardly from its lowermost position to its uppermost position. This so-called "snap action" is accomplished by reason of the passage of pressure initially through the passage 31 to act upon the lower surface of the diaphragm 45 before passing through the atmospheric vent 24. In this respect, it will be understood that while the vent 24 is open to the atmosphere, the static resistance offered by the atmosphere on the outside of the valve casing is such that a slight back pressure is built up below the diaphragm, and the forces of this back pressure will function in combination with the tank pressures acting on the lower face of the valve head 37 to quickly overcome the forces exerted on the upper surface of the diaphragm and thereby insure quick and unretarded movement of said valve member.

The clean-out plug 49 is provided for the purpose of periodically emptying solid foreign particles from the chamber 18, and excess liquids or condensates trapped within the lower portion of the valve chamber 18 below the conduit 20, and by periodically removing the plug 49, the valve may be maintained in a substantially clean and liquid-free condition.

In view of the foregoing, it will be seen that the present invention provides a mechanically efficient, rugged, and structurally simple drain-off valve for compressed air systems, wherein such valve operates automatically in response to the energization and deenergization of an associated compressor to eject moisture and condensates accumulating at the bottom of the compressed air tank or reservoir of the system.

Drain-off valves formed in accordance with the present invention are characterized by their ability to be readily and easily assembled and disassembled for purposes of cleaning, parts maintenance, and/or replacement.

While a present preferred embodiment of this invention has been disclosed in detail, it will be manifest that various modifications may be resorted to without departing from the spirit of the invention or the scope of the following claims.

I claim:

1. A drain-off valve for a compressed air system having a compressed air tank and a compressor operable to introduce air under pressure into said tank, said valve comprising a hollow casing formed intermediately thereof with a transverse division wall dividing said casing internally into upper and lower chambers, an inlet port communicating with the lower chamber and adapted for connection with the lower region of a compressed air tank, an inlet port communicating with the upper chamber and adapted for connection with a compressor, and an atmospheric vent extending through the wall of said casing above said division wall but below the inlet port for the upper chamber of said casing, the division wall of said casing being formed with a screw-threaded opening extending between the upper and lower chambers of said casing; a valve plug threadedly carried in the opening of the division wall of said casing and formed with an axially disposed passage terminating at each end in relatively enlarged valve bores, said plug, at the junctures of said passage and said valve bores, being formed with a pair of opposed valve seats projecting into said valve bores; a movable valve member including an elongated stem portion extending loosely through the passage of said plug and a pair of opposed, relatively enlarged spool portions carried at either end of said stem portion and arranged, upon movement of said valve member, to alternately seat against the valve seats of said plug, the spool portions of said valve member being disposed in close-fitting sliding engagement with the walls of said plug defining said valve bores and being formed at their peripheral edges with a plurality of circumferentially spaced, relatively restricted slots extending from one side of said spool portions to the other; and a flexible diaphragm extending transversely across the upper chamber of said casing between the inlet port thereof and said atmospheric vent and engageable with the upper spool portion of said valve member, said diaphragm serving, upon the introduction of fluid pressures into the inlet port of said upper chamber, to force said valve member downwardly with respect to said plug and thereby momentarily establish communication between said lower chamber and said atmospheric vent by way of the restricted slots of said spool portions and said passage to permit fluids under pressure within the lower chamber to be exhausted to said vent, and thereafter to seat the upper of said spool portions against a valve seat of said plug to close communication between said lower chamber and said vent, and the lower spool portion of said valve member being responsive to a pressure within the lower chamber of said valve in excess of the pressure acting on said diaphragm to shift said valve member upwardly and to seat the lower of said spool portions against the opposite seat of said plug.

2. A drain-off valve as defined in claim 1, and wherein the spool portions of said valve member adjacent said valve seats are provided with resiliently compressible seating faces.

3. A drain-off valve as defined in claim 1, and wherein said casing is provided at the lower end of the lower chamber thereof with a removable clean-out plug.

4. A drain-off valve for a compressed air system having a compressed air tank and a compressor therefor, said valve comprising a generally vertically arranged, open top casing terminating at its upper end in an enlarged attaching flange and having an inlet port formed in a side wall thereof intermediate the ends of said casing and adapted for fluid communication with the lower portion of the compressed air tank and a normally closed clean-out opening formed in the bottom of said casing; a removable cover member for said casing having an inlet port formed therein adapted for fluid communication with the compressor, said casing and cover member defining a substantially closed chamber; a valve-forming body of integral one-piece formation extending transversely across said casing and formed with an enlarged marginal flange carried between the attaching flange of said casing and said cover member and dividing the chamber formed by said casing and cover member into separate upper and lower compartments, said valve-forming body being formed with a central depending collar portion extending axially and downwardly within said casing, said body being further formed at the opposite ends thereof with a pair of relatively spaced upper and lower bores, an axial passage connecting said bores, an exhaust outlet extending radially through the marginal flange of said body and communicating with said upper bore, and a pair of opposed valve seats at the ends of said passage; a foraminous strainer carried by the depending collar portion of said body and surrounding the lower bore thereof; a movable valve member including a stem extending loosely through the passage of said body and a pair of relatively enlarged, opposed, pressure-responsive heads slidably carried in the upper and lower bores of said valve-forming body and arranged for alternate seating engagement with the opposed valve seats of said body, said valve member being movable within said valve-forming body to an intermediate position wherein the heads of said member are disengaged from said valve seats to provide for communication between the inlet port of said casing and the exhaust outlet of said valve-forming body; and a flexible diaphragm carried between the marginal flange of said valve-forming body and said cover member and separating the inlet port of said cover member from said valve-forming body, said diaphragm being arranged to directly engage the upper head of said movable valve member and being operable in response to a given high pressure at the inlet port of said cover member to move said valve member downwardly within said valve-forming body and in opposition to pressures acting upon the lower head of said valve member to thereby momentarily exhaust fluids present within said casing to the atmosphere.

References Cited in the file of this patent

UNITED STATES PATENTS

| | | |
|---|---|---|
| 1,680,288 | Gottschalk | Aug. 14, 1928 |
| 2,509,879 | Pelton | May 30, 1950 |
| 2,548,236 | Parks | Apr. 10, 1951 |
| 2,591,432 | Hoerner | Apr. 1, 1952 |
| 2,619,985 | Wilkerson | Dec. 2, 1952 |
| 2,629,458 | Allen et al. | Feb. 24, 1953 |